United States Patent [19]

Garrido

[11] Patent Number: 5,087,292
[45] Date of Patent: Feb. 11, 1992

[54] PROCESS AND APPARATUS FOR TREATING A LIQUID WITH A GAS

[75] Inventor: Guillermo Garrido, Noisy-le-Roi, France

[73] Assignee: L'Air Liquide, Societe Anonyme pour l'Etude et lExploitation des Procedes Georges Claude, Paris, France

[21] Appl. No.: 507,432

[22] Filed: Apr. 11, 1990

[30] Foreign Application Priority Data

Apr. 11, 1989 [FR] France .................. 89 04746

[51] Int. Cl.$^5$ .................. C22B 9/05
[52] U.S. Cl. .................. 75/681; 266/217; 266/233; 75/699; 210/758; 210/220; 210/221.1; 261/77; 261/121.1; 261/DIG. 75
[58] Field of Search .................. 261/77, 123, DIG. 75, 261/121.1; 210/758, 765, 220, 221.1, 221.2, 911, 912, 194; 266/217, 225, 233; 75/600-602, 663, 664, 690, 668, 697, 699, 700, 703, 706, 678, 680, 681, 745

[56] References Cited

U.S. PATENT DOCUMENTS

| | | | |
|---|---|---|---|
| 2,054,316 | 9/1936 | Gilbert | 210/758 |
| 3,791,813 | 2/1974 | Ramachandran et al. | 266/217 |
| 3,794,303 | 2/1974 | Hirshon | 261/77 |
| 3,804,255 | 4/1974 | Speece | 261/DIG. 75 |
| 4,169,584 | 10/1979 | Mangalick | 266/217 |
| 4,179,375 | 12/1979 | Smith | 210/220 |
| 4,255,262 | 3/1981 | O'Cheskey et al. | 210/221.2 |
| 4,328,958 | 5/1982 | Dolzhenkov et al. | 266/233 |
| 4,355,789 | 10/1982 | Dolzhenkov et al. | 266/233 |
| 4,564,457 | 1/1986 | Cairo, Jr. et al. | 210/221.2 |
| 4,824,579 | 4/1989 | George | 210/703 |
| 5,028,035 | 7/1991 | Baud et al. | 266/217 |

FOREIGN PATENT DOCUMENTS

| | | |
|---|---|---|
| 0073729 | 3/1983 | European Pat. Off. . |
| 2851802 | 6/1980 | Fed. Rep. of Germany . |
| 1448237 | 9/1976 | United Kingdom . |
| 2145700 | 4/1985 | United Kingdom . |

OTHER PUBLICATIONS

Patents Abstracts of Japan, vol. 7, No. 53 (C-154), Mar. 3, 1983; JP-A-57 203 728, 12/14/1982.

*Primary Examiner*—Stanley S. Silverman
*Assistant Examiner*—Neil M. McCarthy
*Attorney, Agent, or Firm*—Browdy and Neimark

[57] ABSTRACT

The invention relates to the treatment of a liquid with a gas. A gas injector, for example oxygen, is surrounded with a sheath to carry a flow of a liquid under treatment (for example lead) which is taken up and circulated by the pump. The end of the injector is thereby protected by moving away the bubbles of oxygen. Application for example in the refining of metals, for example non ferrous metals, food liquids, paper pulps and the production of sulfur.

9 Claims, 1 Drawing Sheet

PROCESS AND APPARATUS FOR TREATING A LIQUID WITH A GAS

BACKGROUND OF INVENTION (a) Field of the Invention

The present invention concerns a process for treating a liquid with a processing gas which is blown in by means of a gas injector which is immersed in a bath of said liquid. This mode of transfer, which results from the formation of a plurality of gas bubbles in the liquid, enables to increase at the maximum the interface gas/liquid, to ensure the longest time of residence possible of the gas in the bath and to produce a type of turbulent flow which is favorable to heat and mass transfers.

(b) Description of Prior Art

However, it happens that the bubbles so formed hardly penetrate into the bath and have a tendency to come back and cluster against the outlet of the injector thereby forming large bubbles which then rapidly climb towards the surface of the bath without fulfilling the functions mentioned above. An explanation for this undesirable phenomenon is that the gaseous flux which originates from the injector has an insufficient quantity of movement (product of "mass×speed") to produce the required turbulence. This is particularly the case of the treatment of non newtonien fluids, such as liquid metals or viscous pastes. In addition to the disadvantage mentioned above of a small utilization of the processing gas, it will be noted that when the treatment is carried out under elevated temperature with oxygen which produces an exothermic reaction with the liquid, hot points are formed in the vicinity of the outlet of the injector, with a risk of destruction of the end of the injector.

SUMMARY OF INVENTION

It is an object of the present invention to provide a process for treating a liquid with a gas, enabling a more efficient use of the processing gas and preventing formation of localized hot points which produce undesirably high temperature in the vicinity of the outlet of the injector.

For this purpose, according to a characteristic of the invention, a flow of the liquid taken from the bath is ejected back in the bath in the immediate vicinity of the gas injector outlet and substantially in the same direction as the gas which is ejected into the bath from the injector outlet.

Experience has then shown that the gaseous bubbles are forced away from the outlet of the injector and that any clustering of the bubbles is thus prevented. This result has been obtained mainly by adding a significant quantity of movement through the additional displacement of the liquid. In addition, there are introduced in the bath of liquid under treatment movements which lead to a rapid homogenization of the liquid phase and therefore a better interaction between the gas and liquid under treatment.

It is also an object of the invention to provide an apparatus for treatment of a liquid comprising a liquid bath receiving vat and a gas injector adapted to be immersed therein, which is characterized by a duct for circulating the liquid from the bath which opens in the immediate vicinity of the outlet of the gas injector. Preferably, the liquid duct has a terminal part which is exteriorly codirectional at the immersed end of the injector and ends in the vicinity of the outlet of the injector.

The invention aims at a certain number of applications of the process and the apparatus mentioned above.

BRIEF DESCRIPTION OF DRAWINGS

The characteristics and advantages of the invention will in any case stand out from the description which follows with reference to the annexed drawing in which:

the single FIGURE is a schematical view in cross-section of an apparatus, which is used by way of example for refining lead, in which the injector is a gas nozzle.

DESCRIPTION OF PREFERRED EMBODIMENTS

Figure 1:
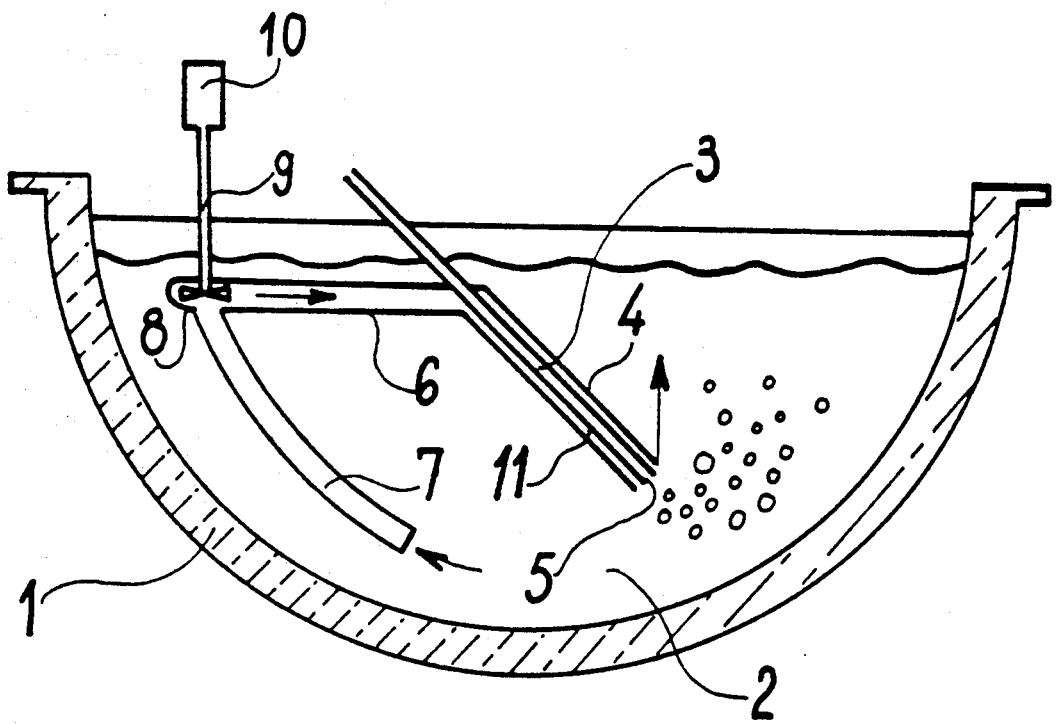

With reference to the drawing, a hemispherical vat 1 contains impure lead, the temperature of the bath varying between 550° C. and 600° C. An oxygen injection nozzle 3 dips mostly in the bath and this oxygen nozzle 3 is surrounded along a short distance thereof by means of a coaxial sheath 4 which, spaced from an outlet 5 of the nozzle 3 but still in the bath of lead 2, is connected through a duct 6 to the outlet of an immersed recirculation pump 8 with driving shaft, exiting at 9 and operated by means of a motor 10, the pump 8 taking up a liquid lead through a duct 7 extending in the vicinity of the bottom of the vat 1. The oxygen nozzle 3 has a terminal linear part in the bath of lead, which is vertically inclined at an angle of about 40°.

The recirculation pump is made of steel, stainless steel or a metallic alloy or is made of ceramic or graphite, or else the recirculation pump and the ducts 4, 6 and 7 are made of a metal or a metallic alloy, with an internal ceramic or graphite coating, or of a so-called composite material, to prevent the pump and the ducts from undergoing chemical or thermic damage.

In operation, during refining, industrial oxygen, i.e. nearly pure oxygen, is sent into the bath of liquid lead. Simultaneously, the recirculation pump 8 sends in through the annular duct 11, between the oxygen nozzle 3 and the sheath 4, a flow of liquid lead taken up from the bath of lead; the duct 11 opens around the flow of oxygen originating from the nozzle 3. The flow of lead protects the end of the nozzle, by causing the bubbles of oxygen to move away and this effect is also the result of the inclination of the nozzle. In addition, the circulation of lead produces a stirring movement in the bath.

Although in most applications the outlets of the gas ducts and of the protecting liquid will be coaxial, in view of the lower density of the gas with respect to that of the liquid it is sometimes desirable to place the outlet of the gas injector codirectionally towards the lower part of the duct section of the protecting liquid, in order to take better advantage of the carrying of the bubbles and the longer time of residence of the gas in the liquid flow. For the same reason, it is always preferable to keep outlet axes in the same vertical plane.

Some examples of application of the invention will now be described in detail:

EXAMPLE I

Refining of Lead

A particular case of application of this invention corresponds to the removal of antimony, arsenic and tin from liquid lead by means of gaseous oxygen. The preferential affinity of oxygen for these impurities enables them to be separated as oxides which are accumulated in the slag. The present technique utilizes the introduction of overoxygenated air (60% $O_2$) by means of a nozzle which is vertically immersed in the bath.

A typical operation of refining takes place in a hemispherical vat 2 m depth, containing 200 tons of lead. The temperature of the bath varies between 550° C. and 600° C. The refining cycle is 20 h if air to which no oxygen is added is blown in. With a mixture containing 50% air and 50% oxygen, the duration is reduced to 12 h. If pure oxygen is injected without any additional precaution, the nozzle is rapidly destroyed. It will also be noted that a high concentration of oxygen produces a rapid increase of the losses of lead in the form of PbO in the slag.

To overcome these difficulties, according to the present invention, a forced flow of liquid lead is used to assist in the injection of pure oxygen, as illustrated in the drawing described above.

The technology described above which requires the use of a stainless steel pump, is easily adaptable to a continuous process for the treatment of lead or other metallic baths in which the melting point is below 750° C.

EXAMPLE II

Food Industry

The cooling of food pulp liquids by means of cryogenic fluids is difficult because of the fast but localized freezing of the bath, which blocks the discharge of cold fluid from the injector. The forced recirculation of a portion of this food pulp around the cryogenic fluid enables to obtain a better spreading of the cold, and simultaneously promotes movements therein. Very often, the container in which this operation takes place is provided with mechanical stirring. Although the two techniques are compatible and can be complementary, it has been established that in the case of dense pulps, the energetic yield of the stirring obtained by forced convection of the "carrier" liquid is better than that obtained with mechanical stirring.

EXAMPLE III

Lignin Removal from Cellulose

The injection of oxygen or hydrogen peroxide can be substantially improved by recirculation of the paste as a current which flows around the outlet of the oxidizing fluid.

EXAMPLE IV

Gas Removal from Aluminum

To reduce the hydrogen content of liquid aluminum, bubbling is carried out with a neutral gas, e.g. nitrogen, argon, sulfur hexafluoride, and sometimes with chlorine doping. This gas is injected through porous refractory plugs from which the gas bubbles exit at very low speed. Interaction between the bubbles and the aluminum is small, and the processing yield is also very low. According to the invention, a movement is produced by a pumping liquid aluminum, where the refining gas is introduced with and by the flow of aluminum which is forced by the pump.

EXAMPLE IV

Production of Sulfur in Liquid Phase From Hydrogen Sulfide

The reaction $H_2S_{(g)} + \frac{1}{2} O_{2(g)} \rightarrow S_{(l)} + H_2O$ is carried out continuously by injecting the gases in liquid sulfur in the presence of a catalyst. The yield of the reaction increases with a higher partial pressure of oxygen. Pure oxygen can be injected if it is introduced with a flow of liquid sulfur to remove the hot point from the end of the injector. The recirculation of liquid sulfur is carried out by means of a metallic pump.

EXAMPLE VI

Treatment or Regeneration of Various Liquids

The process according to the invention has a preferred application in the treatment of industrial effluents with oxygen, the regulation of the pH of industrial effluents, drinking water and industrial processes such as, paper production, dyeing and tanning as well as denitrification of drinking water with hydrogen.

I claim:

1. In a process for treating a molten metal in a molten metal bath with a processing gas, comprising injecting a flow of said processing gas through an outlet end of a gas ejector immersed within said bath of said molten metal, the improvement comprising:
    recirculating a flow of said molten metal from said bath and ejecting said molten metal flow back into said bath in the immediate vicinity of said outlet end of said gas ejector, said ejecting of said molten metal flow being generally co-axial to the direction of said injecting of said flow of processing gas.

2. The process of claim 1, which comprises the step of causing the recirculated molten metal to forcibly circulate towards said outlet end of said gas ejector following a separated flow path immersed in the bath.

3. The process of claim 2, wherein the molten metal is at a temperature greater than 250° C.

4. A process according to claim 1 wherein said molten metal has a melting point no greater than about 750° C.

5. A process according to claim 4 wherein said molten metal is selected from the group consisting of lead, aluminum, zinc, cadmium, magnesium, tin, lithium, sodium, arsenic, antimony, and mixtures thereof; and said processing gas is selected from the group consisting of $CO_2$, $CO$, $H_2$, $O_2$, $N_2$, Ar, $H_2O$ vapor, $SO_2$, $SF_6$, $CH_4$, $Cl_2$ or mixtures thereof.

6. A process according to claim 1 wherein said molten metal is aluminum and said processing gas is chlorine.

7. A process according to claim 1 wherein said molten metal is lead and said processing gas is oxygen or over-oxygenated air.

8. A process according to claim 1 comprising injecting said gas into said bath at a substantial distance below the surface of said bath and at an angle on the order of about 40° from the vertical, and recirculating said molten metal along said gas ejector at approximately the same angle and along a substantial length of said gas ejector.

9. In an apparatus for treating a molten metal in a molten metal bath with a processing gas comprising means for injecting a flow of said processing gas through an outlet end of a gas ejector immersed within said bath of said molten metal, the improvement comprising:
    molten metal ejection means for circulating a flow of said molten metal taken from said bath and ejecting said molten metal flow back into said bath in the immediate vicinity of said outlet of said gas injector, said molten metal ejection means effecting ejecting of said molten metal flow generally co-axially to the direction of said injecting of said flow of processing gas.

* * * * *